United States Patent [19]
Davies

[11] 3,945,066
[45] Mar. 23, 1976

[54] SINGLE-POINT MOORING SYSTEMS

[76] Inventor: Robert Henry Davies, Anfield, Mill Lane, Herne, Kent, England

[22] Filed: Apr. 28, 1975

[21] Appl. No.: 572,053

Related U.S. Application Data

[63] Continuation of Ser. No. 385,345, Aug. 3, 1973, abandoned.

[30] Foreign Application Priority Data

Aug. 7, 1972 United Kingdom............... 36695/72

[52] U.S. Cl.................................................. 9/8 P
[51] Int. Cl.².......................................... B63B 21/52
[58] Field of Search........................... 9/8 P; 114/230

[56] References Cited
UNITED STATES PATENTS

| | | | |
|---|---|---|---|
| 3,082,440 | 3/1963 | Rhedin | 9/8 P |
| 3,264,662 | 8/1966 | Young | 9/8 P |

Primary Examiner—Trygve M. Blix
Assistant Examiner—Gregory W. O'Connor
Attorney, Agent, or Firm—Cushman, Darby & Cushman

[57] ABSTRACT

A mooring buoy for tanker ships is provided with vertical flow channels through which fluids may be passed from an undersea pipeline to a buoy-to-ship hose. Inlets to the flow channels are provided at their lower ends and outlets at their upper ends. To enable a ship moored to the buoy to swing around the buoy during loading, one or more flow channels are provided around a central flow channel, the outlets from each of these flow channels being rotatable about the axis of the central flow channel.

9 Claims, 12 Drawing Figures

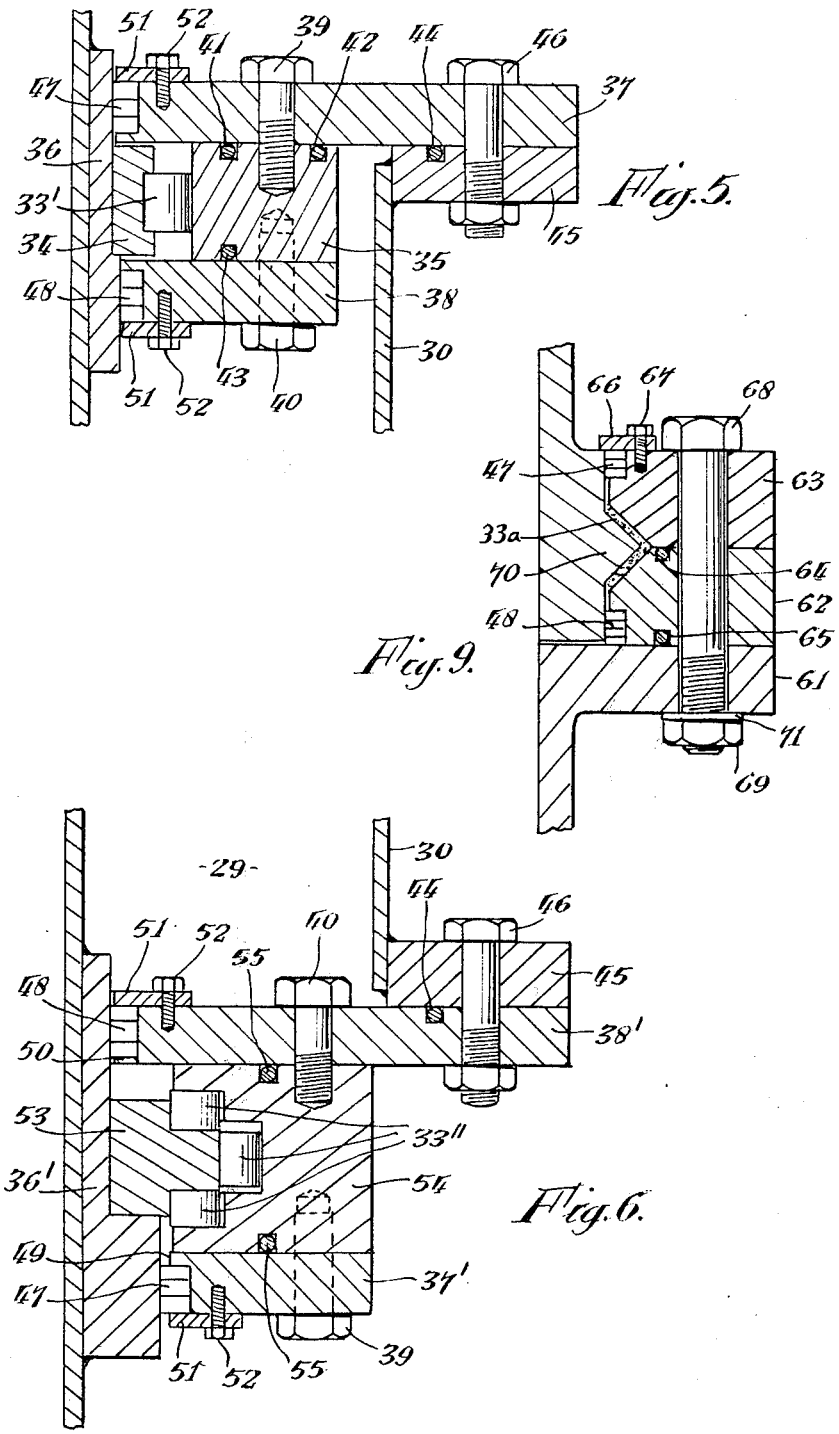

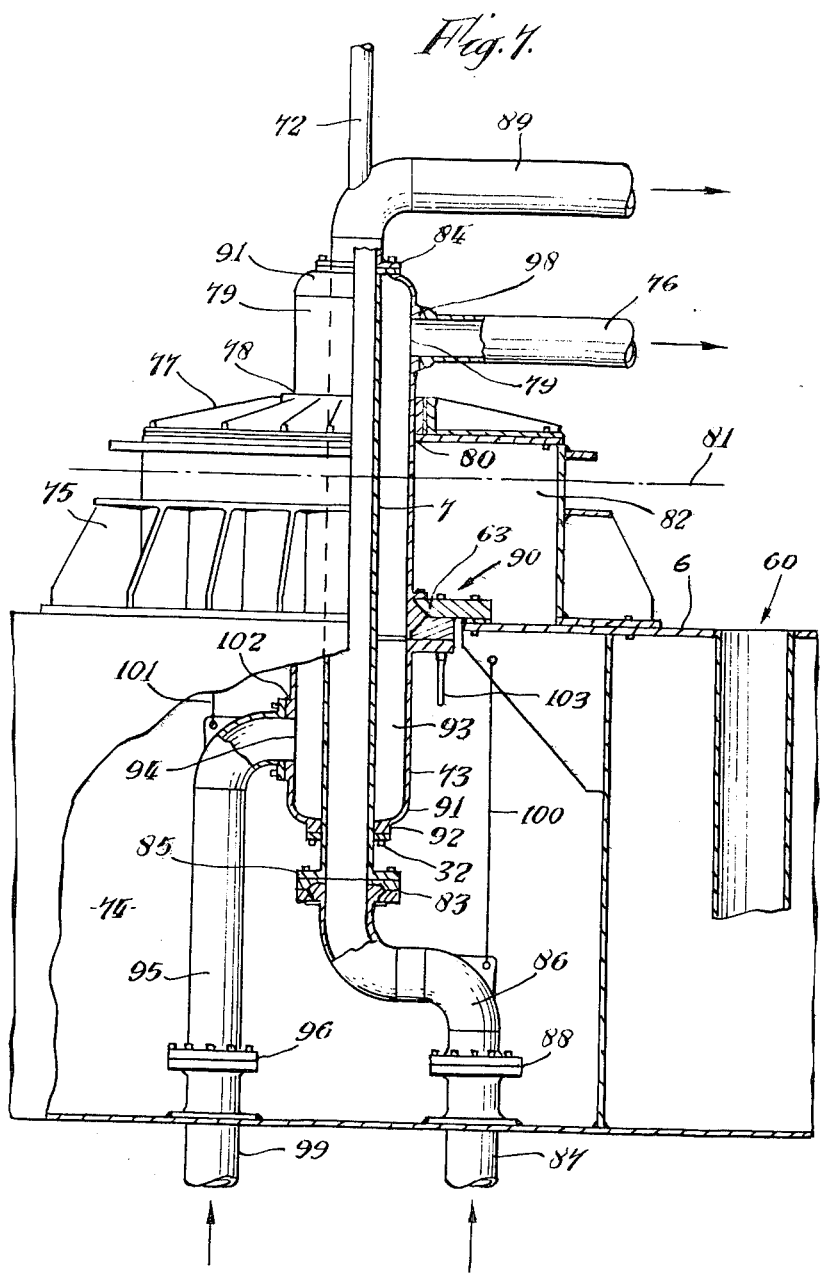

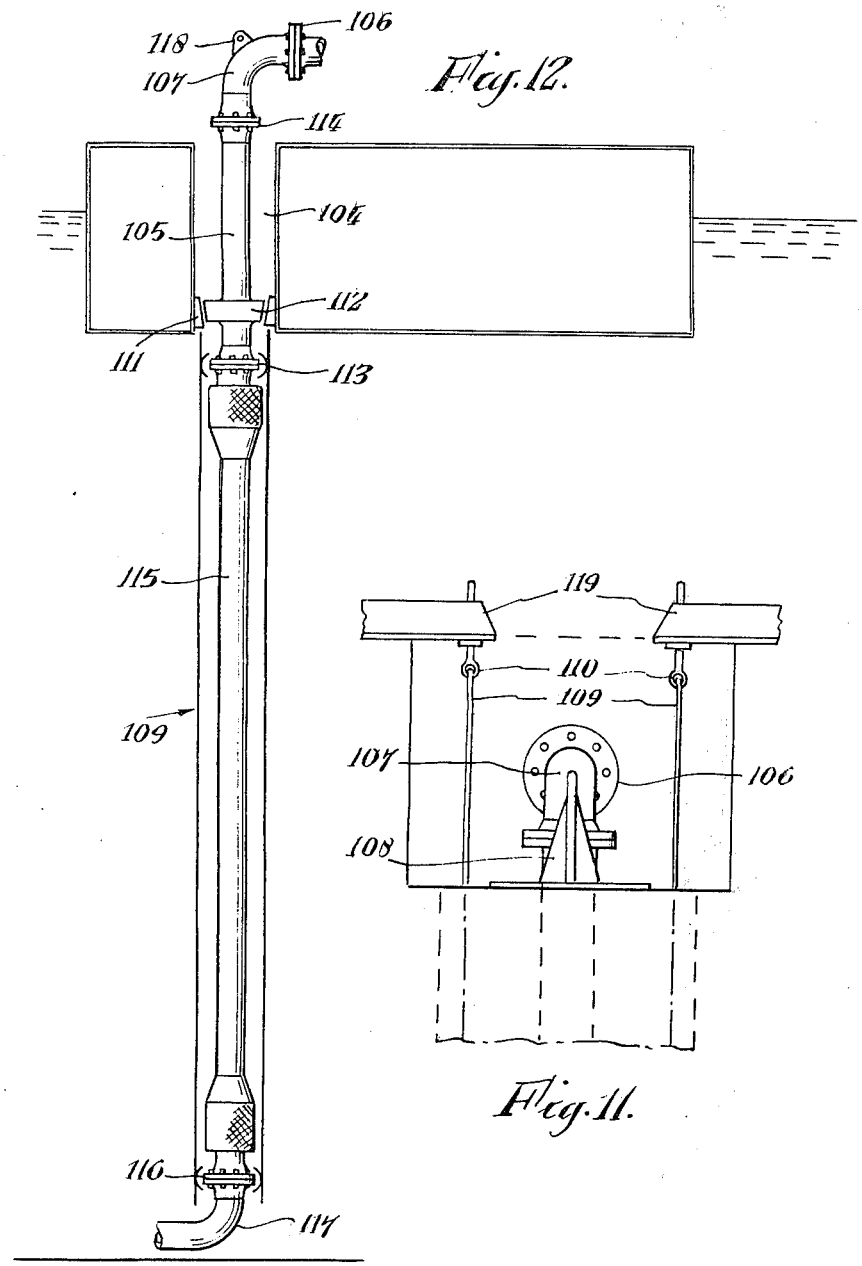

SINGLE-POINT MOORING SYSTEMS

This is a continuation of application Ser. No. 385,345 filed Aug. 3, 1973 now abandoned.

FIELD OF THE INVENTION

The present invention relates to a single-point mooring system and in particular to such a system having a buoy to which ships can be moored so as to be able to swing about the buoy as wind and tide dictate, the buoy being anchored to the sea bed in such a way as to prevent its rotation about a vertical axis, e.g. by means of four anchor chains. More particularly the invention relates to rotatable connecting means for connecting pipelines, e.g. one or more undersea pipelines to one or more buoy-to-ship pipelines.

BACKGROUND TO THE INVENTION

There is a need with such single-point mooring systems to provide the capacity for multiple-fluid transfer i.e. the transfer of several fluids simultaneously, e.g. fuel oil, crude oil, fresh water. The buoy then needs to have a rotatable connecting means which will serve to connect a set of pipelines to another such set while still allowing a moored ship to which one of the sets is connected, to rotate about the buoy.

SUMMARY OF THE INVENTION

According to a first aspect of the present invention I provide a mooring buoy incorporating a multiple flow pipe swivel including a plurality of inlets leading respectively to a central flow channel and to one or more flow channels located round the central flow channel, the central flow channel having an outlet at its upper end to which a pipeline can be connected, and the or each of the other flow channels having a laterally disposed outlet set towards its upper end, the outlet being rotatable about the axis of the central flow channel.

In one embodiment of the invention, the central flow channel terminates in a pipe swivel joint forming an axial extension of the flow channel to which a pipeline can be connected, the or each of the annular flow channels having at least one lateral opening leading into an associated outer chamber housing rotatable about, and coaxial with, its associated flow channel.

A major problem with such an embodiment is the sealing of the outer chamber or chambers to the exterior of the central fixed part (hereinafter called the "swivel head") round which the chamber or chambers rotate.

According to a second aspect of the present invention the sealing of an outer chamber in a mooring buoy as aforesaid is effected by providing a bearing between the outer chamber and the exterior of the swivel head, the outer chamber having flanges sealed to respective opposite flanks of the bearing and extending to positions adjacent the exterior of the swivel head and gland packings retained between said flanges and the exterior of the swivel head to seal the junctions on either flank of the bearing. The two flanges are preferably provided by respective carrier members which support between them a bearing element surrounding a second bearing element. In the case of plain bearings the two elements will make direct bearing contact, whilst in the case of ball or roller bearings the two bearing elements will constitute races for the balls or rollers. In either case the carrier members will extend on either side of the second bearing element, the gland packings being provided between such extension and the swivel head so that a fluid tight seal is provided on each side of the bearing.

In a further embodiment of the invention the lateral outlet or outlets on the flow channel or flow channels round the central flow channel are fixed directly to the upper part of the respective flow channels, and these upper parts are rotatable about the common axis of the flow channels.

Embodiments of the present invention will now be described, by way of example only, with reference to the accompanying drawings wherein:

FIG. 3 to FIG. 6 are respective sections of the bearings shown at A, B, C and D in FIG. 1;

FIG. 7 is a cut-away elevation, mostly in cross section of a second embodiment;

FIG. 9 is a cross section through part of a typical linear swivel; and

FIGS. 10 to 12 show one way in which underbuoy hoses may be connected to a buoy in accordance with the invention;

FIG. 11 is a view along the line XI—XI of FIG. 10.

Figure 1:
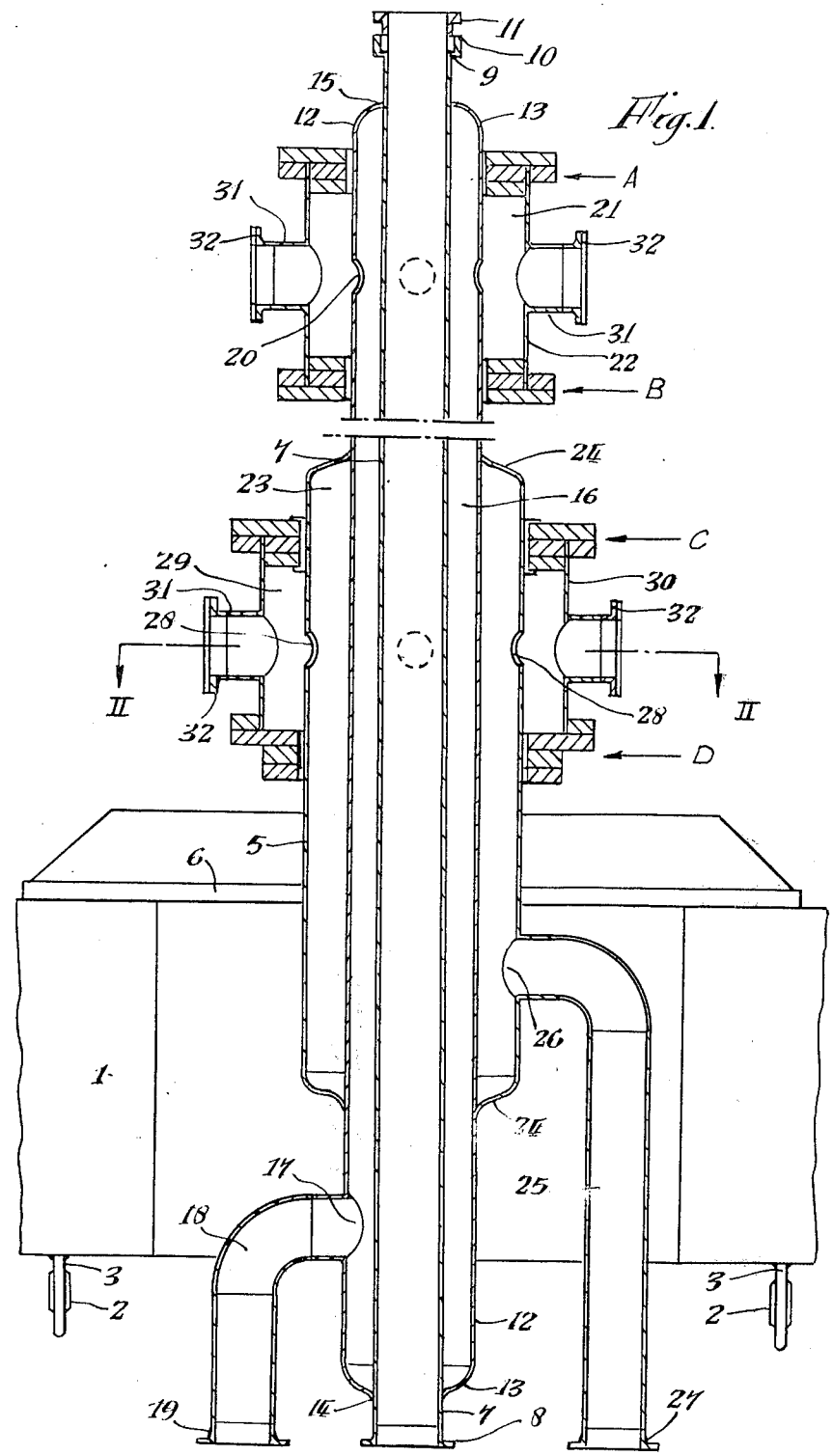
FIG. 1 is a cut-away elevation, mostly in cross section, of a multiple-fluid transfer pipe swivel according to the present invention and mounted in a buoy forming part of a single-point mooring system.
Figure 2:
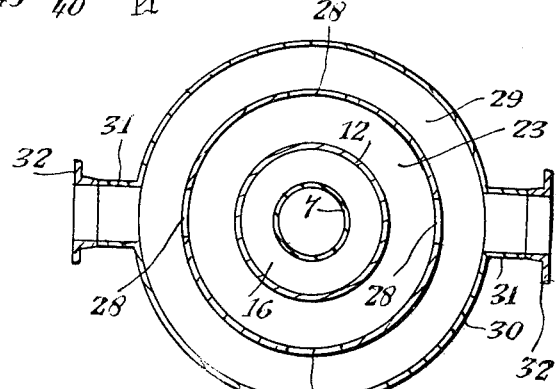
FIG. 2 is a section on the line II—II in FIG. 1.

Referring to FIGS. 1 and 2 a mooring buoy 1 is anchored to the sea bed by four or more anchor chains 2 attached to the lower surface of the buoy at lugs 3. The buoy is generally annular and a multiple flow pipe swivel 4 is partially located in the central hollow of the buoy with its centre line axis coincident with the vertical centre axis of the buoy. The outer shell 5 of the pipe swivel head is rigidly secured to the buoy by means of a welded deck plate 6 which has been suitably stiffened.

The swivel head has a central flow channel in the form of a pipe 7 with flanges 8 and 9 at its lower and upper ends respectively. A known type of pipe swivel joint 10 is attached to the upper flange 9 of the pipe 7 and has a flange connection 11 by means of which a floating buoy-to-ship hose (not shown) can be connected. An undersea hose may be connected to the flange 8 so that the pipe 7 provides an enclosed fluid communication between the undersea hose and the floating hose through the vertical axis of the buoy.

The central pipe 7 has a cylindrical shell 12 enclosing part of its length, the shell being closed at each end by means of dome caps 13 which have openings 14, 15 to allow the pipe 7 to pass through. The dome caps 13 are welded to the outside of pipe 7 at the openings 14, 15 to seal the annular cross-section space 16 formed between the inside of shell 12 and outside of pipe 7. At the lower end of shell 12 there is an opening 17 which communicates with a circular cross-section duct 18 terminating in a flange 19 for connection to an undersea hose. Near the upper end of the shell 12 are four or more substantially circular openings 20 symmetrically disposed about the circumference of the shell. The openings 20 provide direct fluid communication between the annular space 16 and an outer chamber 21 defined between the shell 12 and a cylindrical housing 22 rotatably mounted on the shell 12 by means of bearings generally indicated at A and B.

The cylindrical shell 5 encloses part of the length of the shell 12 to form a second annular cross-section space 23, dome caps 24 being provided to close its ends in a similar manner to the closing of the shell 12 by the dome caps 13. An inlet pipe 25 of circular cross-section is connected to an opening 26 near the bottom of the shell 5. The pipe 25 is provided with a flange 27 for connection to an undersea hose.

Four or more substantially circular apertures 28 are provided in the shell 5 near its upper end, the appertures 28 being symmetrically disposed about its circumference. The apertures lead into an outer chamber 29 defined by the shell 5 and a cylindrical housing 30 mounted on the shell 5 by means of bearings generally indicated at C and D.

Each of the cylindrical housings 22, 30 is provided with two outlet pipes 31 having flanges 32 for connection to buoy-to-ship hoses (not shown).

The multiple-flow pipe swivel described above thus provides three enclosed flow channels through the pipe swivel head. Further channels may be added by lengthening the shell 5 and adding a further shell and rotatable outer housing, in which case it will be the added shell and not the shell 5 which is located in and secured to the deck plate 6.

The bearings indicated at A, B, C and D will now be described in greater detail with reference to FIGS. 3 to 6 respectively.

Figure 3:
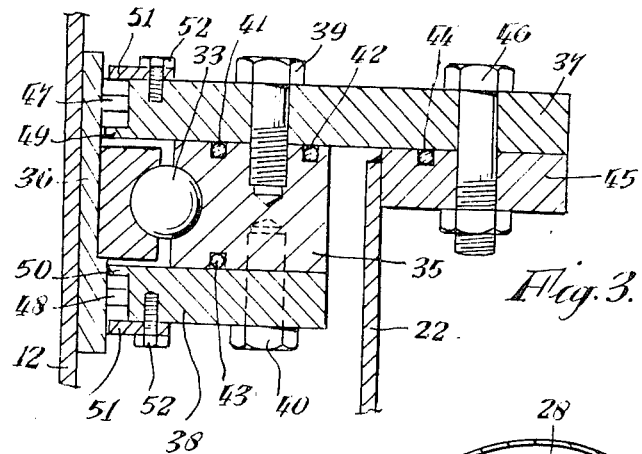

In FIG. 3 is shown the bearing circled at A in FIG. 1. The bearing comprises a ball-bearing 33 which supports the weight of the housing 22 and allows rotation of the housing about the axis of the buoy. Races 34 and 35 extend round the circumference of the shell 12. The race 34 is secured to a flanged cylindrical support member 36 which is welded to the shell 12. The race 35 is held between two carrier members 37, 38 by means of bolts such as 39, 40. O-ring seals 41, 42, 43 are trapped at the junctions between the carrier members and the race 35. An O-ring seal 44 is trapped between the carrier member 37 and a flange 45 which is bolted to the carrier member 37 by means of bolts such as 46. The cylindrical housing 22 is welded to this flange 45. Above and below the race 34 the carrier members 37, 38 are spaced from the support member 36 by means of gland packings 47, 48 which are compressed between respective projections 49, 50 of the carrier members 37, 38 and plates 51 secured to the carrier members by means of bolts such as 52.

Figure 4:
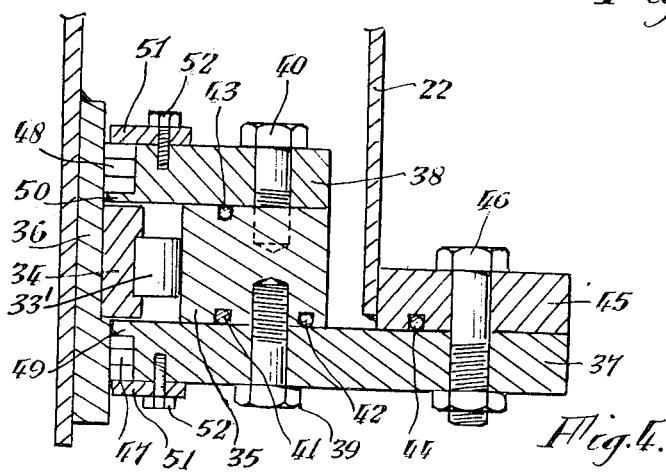

FIG. 4 shows the bearing indicated at B in FIG. 1 and this bearing is similar in construction to the bearing at A except that a roller-bearing 33' is used instead of a ball-bearing. Bearing C shown in FIG. 5 is similar in all respects to bearing B except that it is inverted.

Bearing C provides no support for the weight of the housing 30. To take the weight of this housing therefore I provide three sets of rollers 33" in the bearing D shown in FIG. 6. This necessitates the provision of races 53, 54 which differ in cross-section from races 34 and 35 so that modification of the support member 36' and the carrier member 37' is necessary to compensate for changes in relative dimensions. The flange 45 to which the housing 30 is welded at its lower end is bolted to the upper carrier member 38' so that the other carrier member is outside the chamber 29. Each junction between the carrier members and the race 54 is provided with only one O-ring seal 55. Otherwise, the sealing of the bearing is achieved in a similar way to that used in bearings A, B and C.

The seals between rotating surfaces are subject to wear and may need renewing. The seal between the pipe 7 and the pipe swivel joint 10 may be replaced by unbolting the flange connection at 9. The gland packing seals 47, 48 are made from strips of woven filaments. Access to inner seals 48 is by undoing the bolt 46 at one end of the housing 22 or 30 and the bolt 39 at the other end of the housing. The housing 22, 30 is then moved vertically sufficient to expose the compression plate 51 which is removed and the seal 48 changed. The housing is then replaced and the outer seal 47 changed by removing its compression plate 51.

The pipe swivel thus has a plurality of flow channels in which each channel is sealed from the others by rigid pipe walls capable of withstanding substantial pressures. The number of flow channels that the pipe swivel may accommodate is theoretically unlimited.

Figure 8:
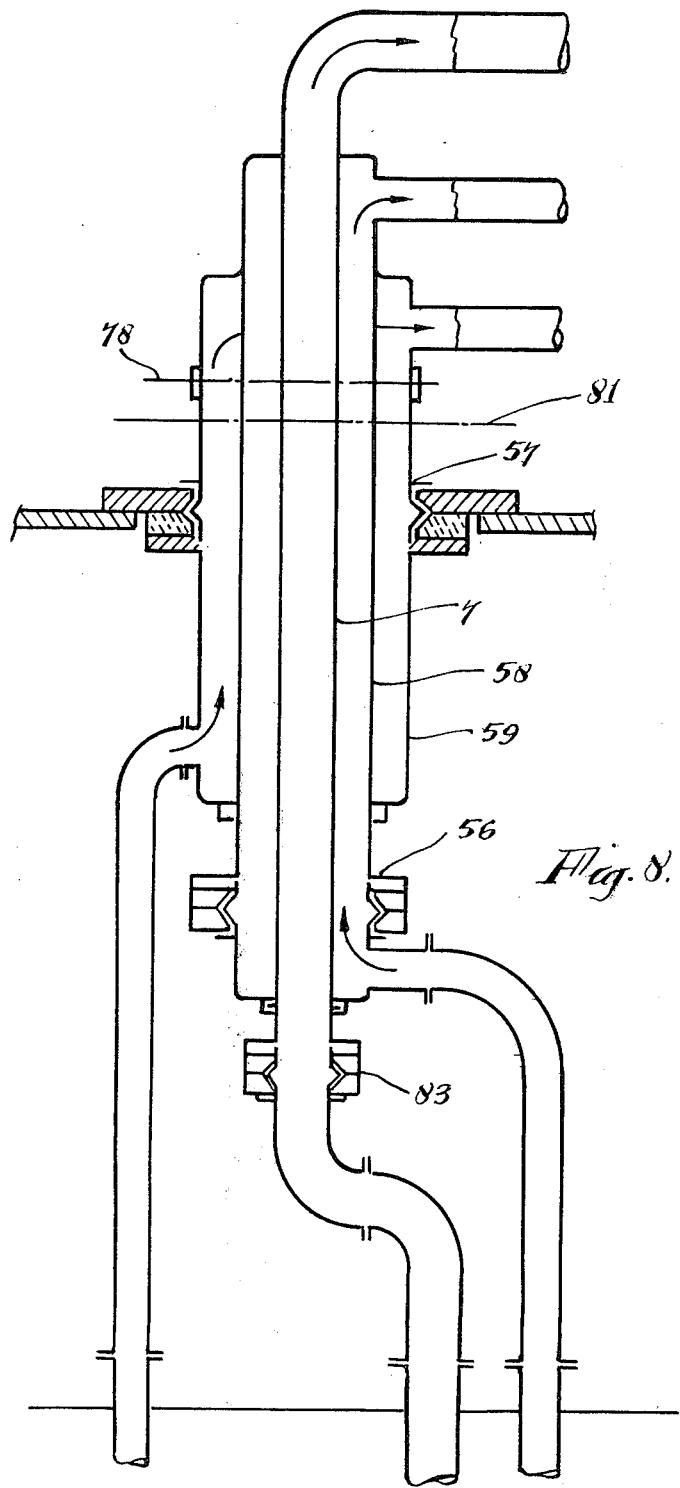
FIG. 8 is a schematic cross section through a third embodiment, showing three product flow paths.

The embodiments shown in FIGS. 7 and 8, like the embodiment shown in FIGS. 1 to 6, provide coaxial flow channels, but differ in that the casings of the flow channels have their upper parts rotatable round their lower parts through pipe swivel joints. In this way the said upper parts can rotate together and can be provided with flanges for connection to buoy-to-ship hoses. Desirably, as shown in this embodiment, the pipe swivel joint for the innermost flow channel lies below the bottom of the outer casing for the next flow channel, and the pipe swivel joint for this outer casing lies below the bottom of the outer casing for the third flow channel (if any), thus providing easy access to the pipe swivel joints.

Coming now to the embodiments of FIGS. 7 and 8 in more detail, the mooring buoy 60 is again adapted to be anchored to the sea bed by anchor chains (not shown). A product distribution unit (hereinafter called "the unit") the upper part of which is rotatable relatively to the lower part, is located in an opening in the buoy deck, and has its longitudinal axis coinciding with the vertical axis of the buoy.

The centre of the unit is formed by a tube 7 with flanges 84, 85 at the upper and lower ends respectively. A flow pipe 89 is connected to the upper flange 84, and this is provided with a suitable connection for a floating hose. A known type of pipe swivel 83 is attached to the lower flange 85 of tube 7. A section of removable pipework 86 formed by known pipe fittings connects tube 7 by means of a flange 88 with pipework 87 which passes down through the buoy and connects with an undersea hose. Hence the tube 7 provides an enclosed communication between the undersea hose and the floating hose through the vertical axis of the buoy. Navigational equipment structure 72 is fixed to rotating flow pipe 89.

The central tube 7 has two cylindrical shells 73, 79 respectively enclosing part of its length. The two shells, 73, 79 are joined by means of a known type of pipe swivel 90. The continuous shell thus formed is closed at each end by dome caps 91 which have openings to allow tube 7 to pass through. The opening at the top is welded to the outside of tube 7 and a packing gland 92 fitted to the lower opening to seal the annulus space 93 formed between the inside of shells 79 and 73 and outside of tube 7, but allowing tube 7 to rotate within shell 73. At the lower end of shell 73 there is a circular opening 94 which communicates with a section of removable pipework 95 formed by known pipe fittings and terminating with a flange 96. This is connected to a pipe 99 leading to an undersea hose. Near the upper end of the shell 79 is another circular opening 97 which connects via a flange 98 to a rotating flow pipe 76, which has a suitable connection for a floating hose. Hence there is a further enclosed communication between an underwater hose and a floating hose attached to rotating flow pipe 76.

The fixed outer shell 73 of the unit is rigidly attached to the buoy by means of a bolted connection via the top flange 63 of swivel 90 and the buoy deck 53 (suitably stiffened). With the unit fixed in this position a water tight lower seal changing area 74 is formed below the buoy deck 6, access to which can be given by removable manhole covers (not shown) in the deck plates. An additional support for the unit is formed by a mooring arm upper support bearing structure 75 which is bolted to the buoy deck and rises to a point just below product flow pipe 76. On top of the structure 75 a split housing 77 contains an upper support bearing 78 of known type which supports the shell 79 via a journal 80 welded to shell 79. A mooring arm (not shown) is mounted on and rotates around structure 75 at the position shown by the broken line 81. An upper seal changing area 82 is formed by the buoy deck, structure 75 and housing 77.

The embodiment shown in FIG. 8 has three concentric flow channels 7, 58, 59, their upper parts rotating respectively at joints 83, 56 and 57.

The pipe swivel thus has a plurality of flow channels in which each channel is sealed from the others by rigid pipe walls capable of withstanding substantial pressures. The number of flow channels that the pipe swivel may accommodate is theoretically unlimited.

The seals between rotating surfaces are subject to wear and may need renewing. The seals at pipe swivel 83 may be replaced by unbolting flange connections between 85 and 88. A wire sling 100 is used to support removable pipework 86. Another wire sling 101 is used to support removable pipework 95 after unbolting flange connections 96 and 102. Then by lowering shell 73 by means of jacking studs 103 access is obtained to inner seal of swivel 90. Packing gland 92 is replaced by removing plate 66 (FIG. 9).

FIG. 9 shows in greater detail a joint between the upper and lower parts of a flow channel. One bearing element 70 is integral with the upper part of the channel, and bears with a plain bearing 33a against the elements 62 and 63 which are secured to a flange 61 on the lower part of the channel by means of bolts 68, nuts 69 and washers 71. Gland seals 48 are provided between the flange 61 and element 62 and the bearing, and outer gland seals 47 are held in position between the upper part of the channel and the element 63, by a plate 66 and screws 67. Further seals are provided between the flange 61 and the bearing element 62 at 65, and between the bearing elements 62 and 63 at 64.

Figure 10:
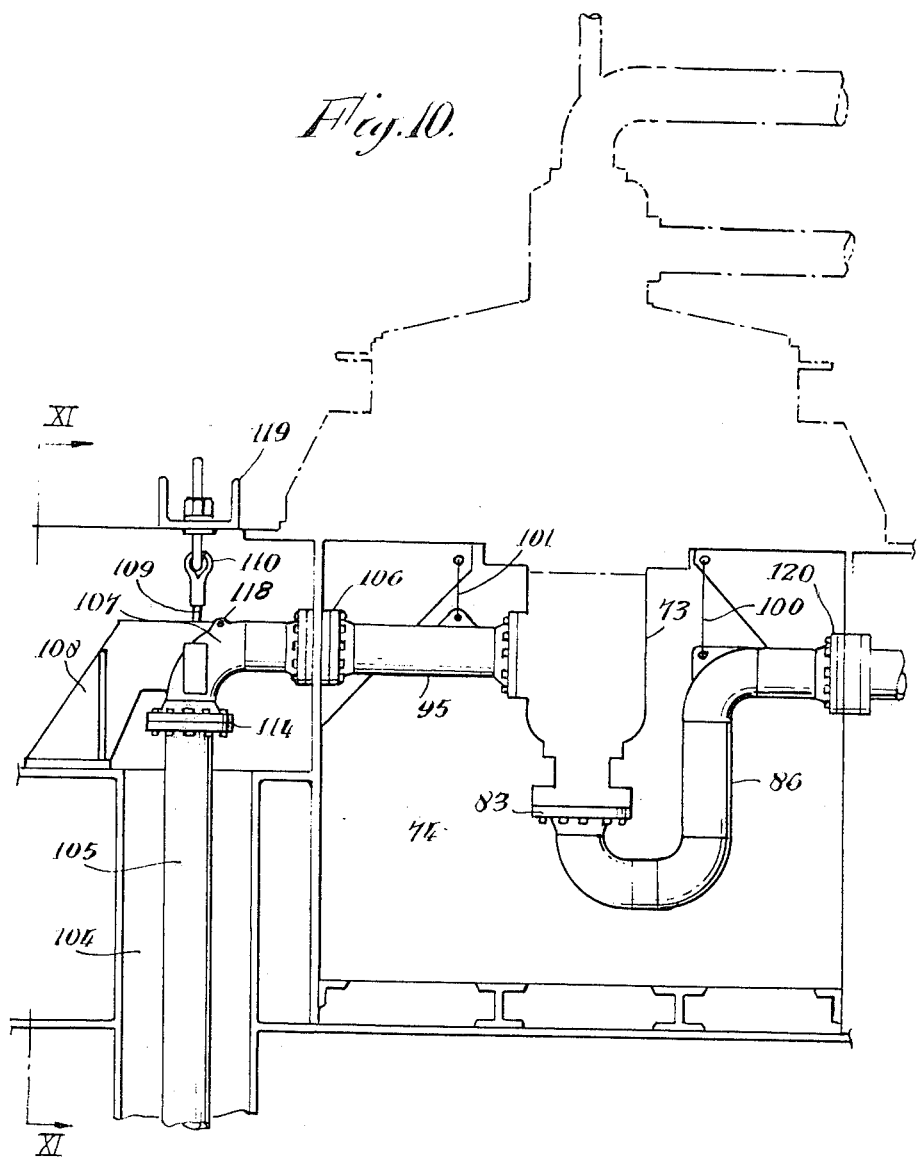

The arrangement shown in FIG. 10 facilitates the installation and removal of underbuoy hoses. In this embodiment, the pipe section 95 has its axis horizontal, and to it is bolted at 106 a removable section 107, supported by a bracket 108. The section 107 is secured at 114 to a vertical pipe section 105, located in a channel 104 through the buoy. At the bottom of channel 104 are provided guide pads 111 to hold in place a collar 112, around pipe section 105. This section is joined at 113 to an underbuoy hose 115 which is coupled at its other end 116 to an undersea pipeline 117.

When it is desired to change the underbuoy hose, the joints 106 and 116 are dismantled, and the entire section between them is lifted out vertically by a lug 118, this operation being aided by guidelines 109, supported at 110 by brackets 119. The dismantling of the joint 116 can be carried out either remotely (with a temporary hydraulic power line) or manually by a diver.

In an analogous manner, removable pipework 86 may be redesigned as shown in FIG. 10 to end in a flange 120 level with the flange 106, the flange 120 being connected to an undersea pipeline in the same way as flange 106.

What is claimed is:

1. A mooring buoy for tanker ships having a buoyancy chamber and means for passing fluids through the buoy from an undersea pipeline to the ship, said means comprising
   a. a first inlet leading to a central flow channel extending through the buoy and having a generally vertical axis,
   b. at least one further inlet leading to at least one outer vertical flow channel of annular cross section located coaxially around said central flow channel,
   c. said central flow channel having a lower end into which the first inlet opens and an upper end with an outlet to which a hose can be connected and a swivel bearing in the central flow channel whereby the upper end of the said channel can swivel about said vertical axis relative to said lower end,
   d. said swivel bearing being axially spaced from said at least one outer flow channel,
   e. each outer flow channel having a lower end into which a further said inlet opens and an upper end portion with a laterally disposed outlet, said laterally disposed outlet being rotatable about said vertical axis by means of a swivel bearing,
   f. each outlet of each flow channel being located exteriorly of and axially spaced from that of any further flow channel, outside that flow channel,
   g. said central flow channel being rigid along its length at least to the extent it extends within said at least one outer flow channel, all the said central and outer flow channels being sealed from one another and deriving structural rigidity from a next innermost said channel against bending forces acting transversely to said vertical axis, and
   h. the swivel bearing of each said outer flow channels being located exterior of and axially spaced from any further flow channels outside the flow channel which it seals, and comprising sealing elements and distinct bearing elements.

2. A mooring buoy as claimed in claim 1 wherein each outer flow channel has at least one lateral opening leading into an associated outer chamber enclosed by a housing rotatable about, and coaxial with, the central flow channel, the outlets being incorporated in the rotatable chamber housing.

3. A mooring buoy as claimed in claim 2 wherein the outer chamber housing surrounding each outer flow channel is supported by sealing bearings sealing only between said housing and said flow channel.

4. A mooring buoy as claimed in claim 1 wherein at least part of the outermost channel is rigid with the buoyancy chamber of the buoy.

5. A mooring buoy according to claim 1 which has a plurality of said outer chambers, each successive radially inner chamber being rigid along its length within a next outer chamber.

6. A mooring buoy according to claim 5 wherein the swivel bearings of each chamber are respectively below the lowermost ends of a next outer chamber.

7. A mooring buoy for tanker ships having a buoyancy chamber and means for passing fluids through the buoy from an undersea pipeline to the ship, said means comprising
 a. a first inlet leading to a central flow channel extending through the buoy and having a generally vertical axis,
 b. at least one further inlet leading to at least one outer vertical flow channel of annular cross section located coaxially around said central flow channel,
 c. said central flow channel having a lower end into which the first inlet opens and an upper end with an outlet to which a hose can be connected and a swivel joint in the central flow channel whereby the upper end of the said channel can swivel about said vertical axis relative to said lower end,
 d. said swivel joint being axially spaced from said at least one outer flow channel,
 e. each outer flow channel having a lower end into which a further said inlet opens and an upper end portion with a laterally disposed outlet, said laterally disposed outlet being rotatable about said vertical axis by means of a swivel bearing,
 f. said central flow channel being rigid along its length at least to the extent it extends within said at least one outer flow channel, all the said central and outer flow channels being sealed from one another and deriving structural rigidity from a next innermost said channel against bending forces acting transversely to said vertical axis,
 g. vertical shafts radially spaced from the vertical flow channels through which hoses connecting the flow channels of the buoy to an undersea pipeline can be inserted and removed, and
 h. the swivel bearing of each of said outer flow channels being located exterior of and axially spaced from any further flow channels outside the flow channel which it seals.

8. A mooring buoy for tanker ships having a buoyancy chamber and means for passing fluids through the buoy from an undersea pipeline to the ship, said means comprising
 a. a first inlet leading to a central flow channel extending through the buoy and having a generally vertical axis,
 b. at least one further inlet leading to at least one outer vertical flow channel of annular cross section located coaxially around said central flow channel,
 c. said central flow channel having a lower end into which the first inlet opens and an upper end with an outlet to which the hose can be connected and a swivel joint in the central flow channel whereby the upper end of the said channel can swivel about said vertical axis relative to said lower end,
 d. said swivel joint being axially spaced from said at least one outer flow channel,
 e. each outer flow channel having a lower end into which a further said inlet opens and an upper end portion with a laterally disposed outlet, said laterally disposed outlet being rotatable about said vertical axis by means of a swivel bearing,
 f. the swivel bearing of each flow channel being located below any flow channels surrounding it,
 g. an outermost flow channel with its swivel bearing located level with a deck of the buoy and the swivel bearings of all the flow channels being located in a water-tight seal changing area into which pass inlets from underbuoy hoses,
 h. said central flow channel being rigid along its length at least to the extent it extends within said at least one outer flow channel, all the said central and outer flow channels being sealed from one another and deriving structural rigidity from a next innermost said channel against bending forces acting transversely to said vertical axis, and
 i. the swivel bearing of each said outer flow channel being located exterior of and axially spaced from any further flow channels outside the flow channel which it seals.

9. A mooring buoy for tanker ships having a buoyancy chamber and means for passing fluids through the buoy from an undersea pipeline to the ship, said means comprising
 a. a first inlet leading to a central flow channel extending through the buoy and having a generally vertical axis,
 b. at least one further inlet leading to at least one outer vertical flow channel of annular cross section located coaxially around said central flow channel,
 c. said central flow channel having a lower end into which the first inlet opens and an upper end with an outlet to which a hose can be connected and a swivel joint in the central flow channel whereby the upper end of the said channel can swivel about said vertical axis relative to said lower end,
 d. said swivel joint being axially spaced from said at least one outer flow channel,
 e. each outer flow channel having a lower end into which a further said inlet opens and an upper end portion with a laterally disposed outlet, said laterally disposed outlet being rotatable about said vertical axis by means of a swivel bearing,
 f. the swivel bearing of each flow channel being located below any flow channels surrounding it,
 g. an outermost flow channel with its swivel bearing located level with a deck of the buoy and the swivel bearings of all the flow channels being located in a water-tight seal changing area into which pass inlets from underbuoy hoses,
 h. said outermost flow channel having a lower part supported on jacking studs, and removable pipe sections being provided connecting said inlets from underbuoy hoses to said inlets at the lower ends of said flow channels, said pipe sections being provided with cables to support them when said swivel bearings are dismantled,
 i. said central flow channel being rigid along its length at least to the extent it extends within said at least one outer flow channel, all the said central and outer flow channels being sealed from one another and deriving structural rigidity from a next innermost said channel against bending forces acting transversely to said vertical axis, and
 j. the swivel bearing of each said outer flow channel being located exterior of and axially spaced from any further flow channels outside the flow channel which it seals.

* * * * *